United States Patent [19]
Anderson et al.

[11] 3,735,168
[45] May 22, 1973

[54] HIGH VOLTAGE INSULATED COIL AND MACHINE UTILIZING THE SAME

[75] Inventors: Robert L. Anderson, Bay Village; Marvin M. Fromm, Cleveland Heights, both of Ohio

[73] Assignee: Portec, Inc., Cleveland, Ohio

[22] Filed: Dec. 20, 1971

[21] Appl. No.: 210,178

Related U.S. Application Data

[63] Continuation-in-part of Ser. No. 119,571, March 1, 1971, Pat. No. 3,662,199.

[52] U.S. Cl. .................. 310/200, 310/45, 310/208, 336/209
[51] Int. Cl. ............................................. H02k 3/00
[58] Field of Search .................. 310/194, 208, 209, 310/189, 200, 182, 271, 43, 45; 336/209

[56] References Cited

UNITED STATES PATENTS

| | | | |
|---|---|---|---|
| 3,629,024 | 12/1971 | Kimura | 310/208 |
| 3,483,413 | 12/1969 | Logan | 310/271 |
| 1,306,625 | 6/1919 | Priest | 310/208 |
| 2,656,290 | 10/1953 | Berberich | 310/208 UX |
| 3,531,751 | 9/1970 | Sargent | 310/208 |
| 1,926,331 | 9/1933 | Cullin | 310/208 |

FOREIGN PATENTS OR APPLICATIONS

| | | | |
|---|---|---|---|
| 599,028 | 12/1925 | France | 310/208 |

*Primary Examiner*—R. Skudy
*Attorney*—James H. Tilberry, Alfred C. Body and Robert V. Vickers

[57] ABSTRACT

An improved insulated coil for an electrodynamic machine is prepared by wrapping multiple layers of a wide insulative wrapper around the straight section of the coil, in overlapping contact with a narrow insulative tape applied on the end portion of the coil. The wrapped coil is then vacuum-pressure impregnated with a liquid, heat-reactive resin, and the coil is then heat and pressure treated to cure the liquid resin impregnate to a permanent, solid set and to form thereby an insulated coil with a continuous, unitary insulative joint between the wrapper and the tape.

14 Claims, 2 Drawing Figures

Patented May 22, 1973 3,735,168

HIGH VOLTAGE INSULATED COIL AND MACHINE UTILIZING THE SAME

This application is a continuation-in-part of our co-pending application Ser. No. 119,571, filed Mar. 1, 1971, now U.S. Pat. No. 3,662,199, issued May 9, 1972 and assigned to the assignee of this application.

This invention is applicable to the art of electrodynamic machines in general and of insulated conductors for electrodynamic machines in particular. More particularly, the invention is applicable to insulated conductive coils for use within electric generators, motors and other equipment.

The invention is particularly applicable to high voltage insulation for motor and generator stator windings, and most particularly to alternating current armature windings and will be described with particular reference thereto although it will be appreciated that it has broader applications, such as for electrodynamic coils and conductors in general. Accordingly, the invention will for convenience be described and illustrated in terms of insulated alternating current armature coil windings, but it is to be understood that the invention is equally applicable to coils in general.

Electric generators and motors contain conductive coil windings relative to which a magnetic field is rotated in order to induce an electric current within the windings, or through which an electric current is passed in order to induce a magnetic field about the coil. Such generators and motors may be referred to generally as "electrodynamic machines". These electrical conductors or coils are usually encased in slots within an iron housing or core coextensive with the magnetic field in order to provide an efficient conductive flux path between the coils. The efficiency, dielectric strength and life of the insulation wrapped around these coils is probably the single greatest factor in determining the reliability and continuity of service of the generator or other equipment.

Stator coils generally comprise a conductor having two straight sections which traverse the length of an imposed magnetic field plus, for reasons explained hereinbelow, a distance beyond each end of the field, this distance being referred to as the "extension". The straight sections are joined at one end in a generally V-shaped return bent section, and converge at the other end in a second, generally V-shaped return bent section to form a pair of parallel conductors.

Insulation of high voltage stator coils is usually accomplished by means of wrapping the coils with insulative mica tape in overlapping helical fashion until the required thickness of is built up on the coil. The usual sizes of tape come in ¾, 1, and 1¼-inch widths and it is the usual practice to overlap each turn of tape over one-half the width of the preceding turn. This overlapping technique results in two thicknesses of tape for each effective turn of insulation. The tape winding method has been generally used for about 40 years. Prior to that time, it was common practice to insulate the straight section of the coil (the straight section of a stator coil in a modern machine typically measures between about 2 feet to about 6 feet in length, although it may be either shorter or longer) with a wide insulative wrapper, usually a mica insulative wrapper. The mica wrapper comprised wide sheets of fabricated mica backed with thin paper and bonded together with shellac. The insulation wrapper was applied to the straight parts of the coils in overlapping fashion by means of a machine which heated and rolled the wrapper onto the coils. The end turns or return bent sections were then insulated with multiple layers of varnished cloth tape. The problem with this technique however, was that electric breakdown was experienced at the joint between the wide sheets of mica wrapper on the straight parts of the coil and the tape on the return bent portions of the coil. The joint occurs at the portion of the coil where the straight section turns into the return bent section. It is for this reason that the straight section of the coil has an extension which projects beyond the iron core or housing so that the joint is removed a distance, (defined as the extension) from the iron core or housing, to reduce the electrical stress on the insulation at the joint. Typical extensions are 2½ inches, 4½ inches or a suitable distance up to about 6 inches in length.

Improvements made to the insulative wrapping materials by replacing the varnish, shellac, paper, etc. with more modern materials generally increased the efficiency of this type of wrapper-tape insulation. However, by the early 1930's, as machines became larger and the length of the straight section of the coil increased, weakening of the joint between wrapper and tape by vibration and thermal expansion and contraction of the stator, and a general lower dielectric strength at the joint caused frequent dielectric breakdown at this point. Accordingly, in order to eliminate the joint it became common practice in the industry to wrap the entire stator coil with a narrow mica tape so that after a suitable hot press step there would be no junction between a wrapper and tape, but rather a continuous, homogenous, overlapping tape which would provide constant insulation throughout the length of the coil. This practice is standard in the industry, to this day.

It will be appreciated that wrapping the entire straight length section of the stator coil, of which there are numerous coils in a single machine, requires a great deal of hand labor, or the use of tape wrapping machines, as this tape must be applied in carefully controlled overlapping relationship to insure a continuous, uniform covering of insulative material of a sufficient dielectric strength.

In addition to the labor and time involved in winding the overlapping tape, it will be appreciated that the overlapping required increases the thickness of the insulation since a single, overlapping turn involves two layers of tape. Aside from the increased insulator cost, the increased thickness of insulation requires increased slot sizes in the iron core which results in a general increase in equipment size for a given rating or output requirement. This is because thicker insulation requires larger slots in the iron core to receive a given size coil thus reducing iron content, and consequently the magnetic flux, per volume of iron core.

Insulative tapes currently in use are generally mica tapes of at least 50 percent mica content, in some cases impregnated with a partially cured resin bonding material, usually an epoxy or a polyester resin, which can be permanently set by heating after the tape is wrapped around the stator coil. Alternative, the insulated coil may be impregnated with a liquid filling resin introduced by vacuum-pressure impregnation, then heat cured. The mica tape is usually followed by a finishing tape wrapping which is usually, but not necessarily, a glass tape. After the heat curing step, the coil may be varnish-dipped and baked in a finishing operation.

The present invention contemplates a new and improved insulated coil, and new and improved electrodynamic machines employing said coil, which overcomes the above-mentioned shortcomings of the prior art and provides a more efficient and economical electrodynamic machine.

The insulated coil of the invention has a total thickness of insulative wrapping which is less than the thickness of the prior art wrapping of equivalent dielectric strength because of the use of a wide wrapper along the straight portion of the coil instead of overlapping tape, with resultant reductions in machine core slot size for a given rating.

In accordance with the present invention there is provided an insulated coil for an electrodynamic machine, which coil has an insulative wrapping comprising a wide insulative wrapper and a narrow insulative tape, both of which, when vacuum-pressure impregnated with a liquid, heat-cureable bonding resin may be cured into a unitary insulative covering throughout, including the joint therebetween.

The invention described and claimed in our Patent referred to above, concerns the utilization of wide insulative wrapper and narrow insulative tape which are both impregnated with a B-staged resin prior to being applied to the coil. By "B-staged" resins are meant resins which have been partially cured to a flexible, non-liquid state, but not finish cured to a hard, final, thermoset. In accordance with the teaching of U.S. Pat. No. 3,662,199 the wide wrapper and insulative tape are each impregnated with a resin, either the identical B-staged resin, or different B-staged resins which are compatible one with the other, upon curing. Because of the flexibility of the B-staged resin, the impregnated tape and wrapper may readily be wrapped around the coil in the manner described in Patent.

It has now been found that the wide insulative wrapper and narrow insulative tape may be impregnated with a liquid resin by known vacuum-pressure techniques, after the wrapper and tape have been applied to the coil, in lieu of wrapping the coil with a B-staged resin-impregnated wrapper and tape.

(The term "vacuum-pressure impregnation" as used in the specification, and claims, means subjecting a wrapped coil to vacuum, immersing the coil in liquid resin while under vacuum and applying pressure to the liquid resin to force it into the wrapping material.)

In one aspect of the present invention, there is provided an insulated coil for an electrodynamic machine, with the coil insulative wrapping comprising (1) a wide wrapper insulative material wide enough to cover in a single turn of wrapping at least a substantial segment of the straight portion of the coil which wrapper is applied in multiple layers by successive follow-on-turns and, (2) an insulative tape in narrow widths suitable to apply in overlapping layers to the return bent portions of the coil. As hereinabove stated, the wrapper and tape, after application to the coil, are impregnated with a liquid resin, which is then cured. Accordingly, the wrapper and tape may be substantially resin-free when applied to the coil. However, both the wrapper and the tape, or either of them, may contain a small quantity of resin binder which may or may not be chemically reactive with the liquid filling or bonding resin later introduced into the wrapping and tape by the vacuum-pressure impregnation technique.

The purpose of the resin binder is to hold the mica particles, glass fibers and/or other materials comprising the wrapper or tape in sheet or tape form. Although, as aforesaid, the resin binder may or may not ultimately react with the liquid filling or bonding resin, the resin binder is not a B-staged resin. Since the tape and wrapping are designed to be impregnated with a liquid resin, it is advantageous for them to have as large a number of interstices as possible; accordingly, the amount of resin binder used is normally the minimum amount which will hold the mica and other particles and/or fibers into a cohesive, sheet-like form. The precise proportion of resin binder particles/fibers will of course vary, depending upon the size, quantity and binding characteristics of the specific particles/fibers used, and on the type of binder resin employed.

While it is preferred to cover the entire straight length of the coil with multiple turns of a single width of wide wrapper, if the straight section of the coil is longer than the width of the available wide wrapper, the wide wrapper may be applied in two or three or more successive adjacent widths to cover the entire straight length of the coil with a wrapper of width one-half, one-third, etc. of the straight section.

Alternatively, and preferably, a too-narrow wrapper can be applied lengthwise, using two or more lengths of wrapper to achieve the required number of follow-on turns.

In accordance with another limited aspect of the invention, there is provided an insulated coil whose insulation comprises the curd product of a wide insulative wrapper and a narrow insulative tape, both of which are vacuum-pressure impregnated with liquid heat reactive resin. By "heat reactive" resin, is meant resins which are originally liquid and which will harden and permanently thermoset under heat curing. Upon heat curing, the joint between the wrapper and the tape is chemically bonded into a unitary joint having a dielectric strength at least as great as the dielectric strength of the insulative wrapper on the straight portion of the coil. The insulative wrapping of the invention is applied in the form of material which is either substantially resin-free or contains a small, i.e., non-insulative amount of resin binder, is then vacuum-pressure impregnated with a quantity of liquid resin sufficient to give the finished wrapping the required dielectric strength and then is finish cured into a thermoset, hard, infusible material.

The principal object of the invention is to provide an electrodynamic machine containing coils insulated with a combination of liquid resin-impregnated wide wrapper and tape which has been finish cured to comprise a total thickness of insulative wrapping which is less than the thickness of prior art wrappings of equivalent rating, which provides a unitary, dielectric joint between wide wrapper and tape, and which may be applied to the coils in an efficient and economical manner.

Other objects of the invention will become apparent from the following description and the accompanying drawings. The invention takes physical form in certain parts and arrangement of parts, a preferred embodiment of which is described in detail in this specification and illustrated in the accompanying drawings which form a part hereof and wherein.

Figure 1:
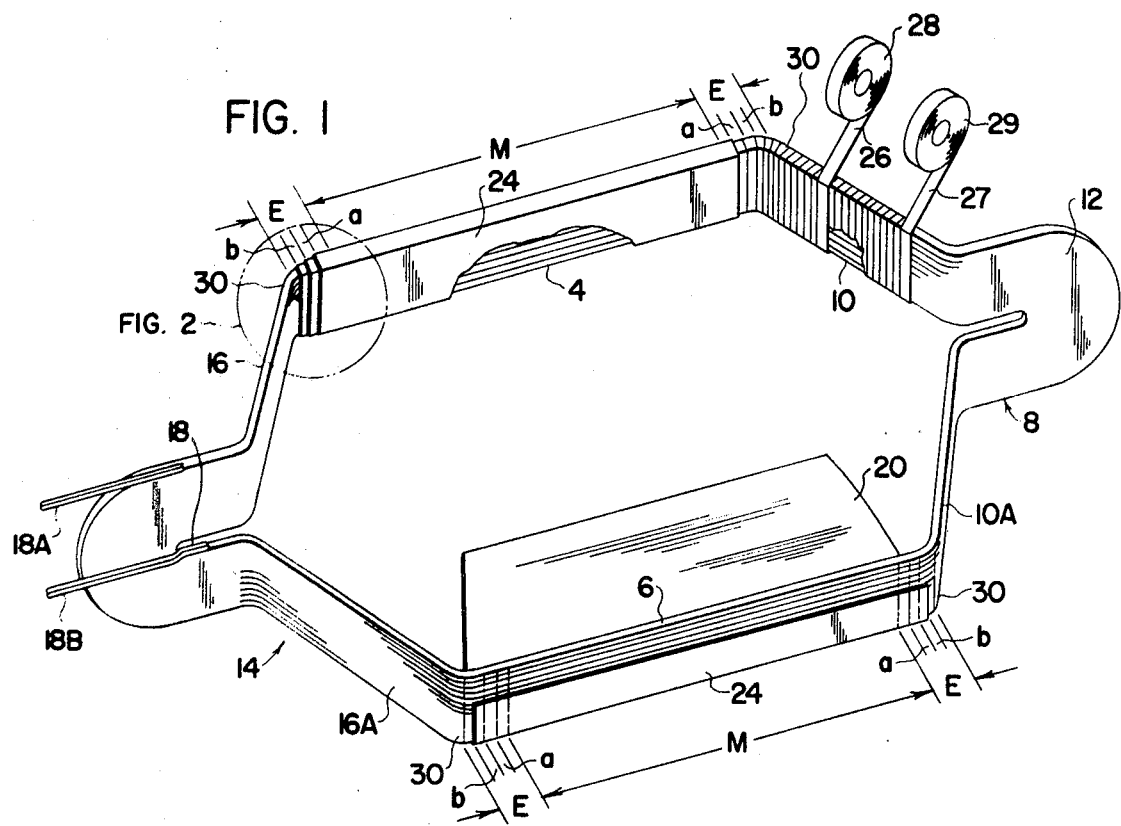
FIG. 1 is a schematic perspective view of an alternating current armature coil showing the insulative wrapping partially applied.

Stator coils, as aforesaid, have straight sections which may usually, but not necessarily, be between about 2 and 6 feet in length. A wide insulative wrapper in multiple layers is advantageously employed in order to cover this straight section without joints in the insulative wrapping and with a minimum of time and labor. Referring now to FIG. 1, a typical stator coil is shown as having straight sections 4 and 6, respectively. The stator coil shown is one of a plurality of coils which are inserted into slots in an iron core comprised of laminated sheets of iron. The length of the iron core and of the imposed magnetic field extends the distance M shown in the drawing. The extensions, the distance which the straight sections of the coil extend beyond the magnetic field and iron core is shown by the distances E. A generally V-shaped return bent portion generally designated 8 consists of short sections 10 and 10A and a knuckle section 12. A second return bent section 14 consists similarly of two short sections 16 and 16A which merge into a knuckle section 18 to form coil leads 18A and 18B.

An insulative wide wrapper 20 is depicted schematically and is shown as having a halfwrap taken around straight section 6. Sufficient turns of the wrapping material are taken around the stator straight section 6 to provide the requisite thickness of insulation. Straight section 4 is shown with a partially cut-away view of the completed insulative wrapping 24 in place. Wrapper 20 is preferably equivalent in width to the length of straight section 6 which is to be insulated since this does away with joints along the straight section of the coil.

Figure 2:
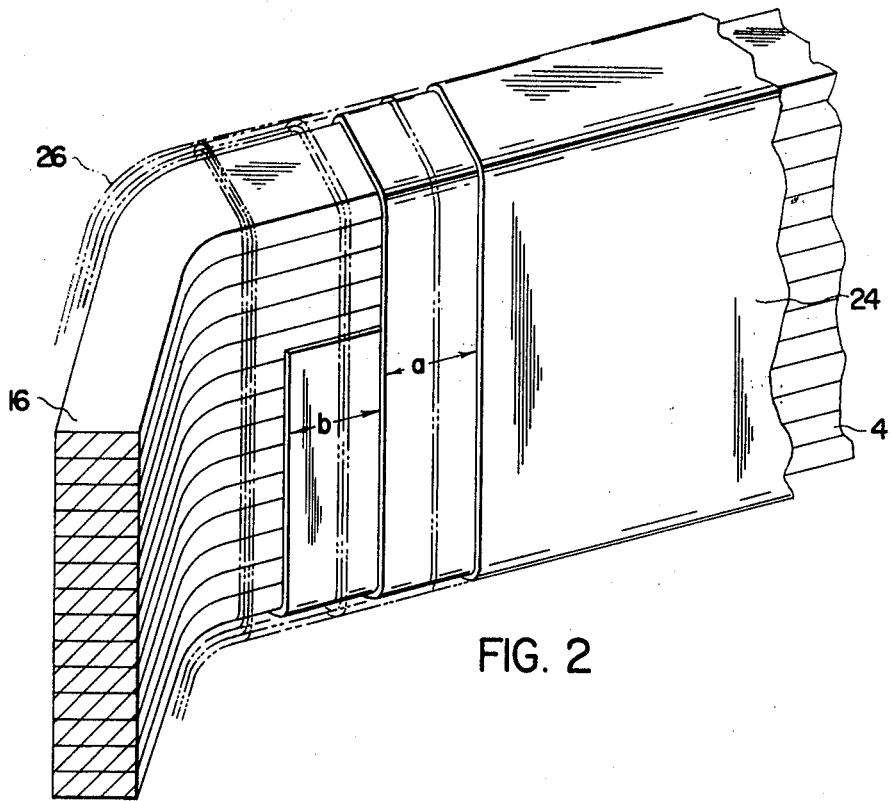
FIG. 2 is an enlarged section of the joint portion of the coil of FIG. 1.

Reference is now made to FIG. 2, which shows an enlarged section of the wrapping at the end of wide wrapper 20, and which is typical of the four corners where straight sections 4 and 6 meet return bent sections 8 and 14. It is seen (FIG. 1) that wrapping 20 is tapered at its edges so that the width of the layers of wrapper around section 4 (FIG. 2) diminishes in going from the end of the straight section to the end of the wrapper. A first width $a$ and a second width $b$ of diminished width of wrapper turns are shown, it being understood that there may be more than two such layers of diminished width of wrapper.

Return bent portions 8 and 14 are wrapped with an insulative tape 26 shown schematically as being supplied from tape roll 28. Insulative tape 26 and insulative wrapper 20 may be substantially resin-free, or may contain small amounts of a binder resin. The resin which is cured to provide the insulated wrapping in accordance with the invention is applied as a liquid by a vacuum-impregnation technique, as discussed in detail hereinbelow.

The return bent portions are overwrapped with insulative tape 26 as shown in FIG. 2 with respect to short section 10 of return bent portion 8. The layer of taping is commenced at or near width $b$ (as best shown in FIG. 2) of diminished numbers of wrappers and continues to advance on to the unwrapped section of the bent portion of the coil. A second layer is commenced at or near width $a$, and so on.

The overlapping relationship of insulative tape with the tapered ends of insulative wrapper is best shown in FIG. 2 wherein tape 26 is shown in dotted lines as being applied in an increasing number of layers over width $a$ and width $b$ then on to the unwrapped portions of straight section 4 and short section 16.

By thus overlapping the tape and the wide wrapper, the joint is formed at the critical corners 30 which, when the vacuum-pressure impregnated, liquid resin material is cured under the heat treatment which is applied subsequent to the wrapping operation, forms a chemically bonded unitary joint which in testing has shown a dielectric strength at least equal to that of the insulative wrapping 24.

In a test of the method of the invention, a coil was insulated with 13½ wraps of mica paper material designed for vacuum impregnation, i.e., a paper material with a high proportion of interstices capable of accepting the liquid resin. The corners and half of the return bent portion of the coil (generally, that portion of the coil corresponding to the section of coil shown as wrapped with tape 26 in FIG. 1) were insulated with 10 half-lapped layers of mica paper tape of the same material. By "half-lapped" is meant that each succeeding turn of tape overlies one-half the width of the previous turn of tape. The remainder of the return bent portions, (generally, that portion of the coil corresponding to knuckle 12 and the portion shown as wrapped by tape 27 in FIG. 1) were insulated by 10 half-lapped layers of a fully cured insulative tape. A glass-dacron finish tape was then applied.

The coil was vacuum pressure impregnated as follows:

The coil was placed in a steel pressure vessel which was evacuated to 3mm of mercury absolute pressure. This vacuum was held for 1 hour and then liquid resin was admitted to the vessel in sufficient quantity to submerge the coil. The vacuum was held for another hour thereafter. The vacuum valve was then closed and dry nitrogen gas admitted to the pressure vessel until the pressure reached 80 lbs. per square inch. This pressure was held for 3 hours, and then the liquid resin was returned to its storage tank by using the nitrogen gas pressure. The nitrogen gas was then vented to atmosphere, the tank lid opened and the liquid-impregnated coil removed.

The straight sections of the coil (corresponding to sections 4 and 6 of FIG. 1) was cured by heating in a hot press for 2 hours at 400°F, and the entire coil was then baked in an oven for 14 hours at 325°F.

(The cycle of press cure and oven bake may be varied to suit the requirements of the particular liquid impregnating resin used.)

The coil prepared as described above was tested at room temperature to failure using a 1 minute step test with the following results:

DIELECTRIC STRENGTH TEST
VACUUM-PRESSURE IMPREGNATED COIL

|  |  | Breakdown, stress, Volts/mil. |
|---|---|---|
| Single wall average thickness of insulation | .131 inch |  |
| Break down voltage, middle of straight section | 56.0 Kv | 427 |
| Break down voltage, joint between wrapper and tape | > 59.0 Kv* | > 450 |

* Failure occured by flash-over to the fully-cured tape wrapped section of the coil. The joint between the cured liquid resin wrapper and tape did not fail.

The feasibility of using a combination of cured, liquid resin-impregnated wide wrapper and contiguous insulative tape is shown by the foregoing, since the breakdown strength of the joint between the wrapper and the tape is higher than the breakdown voltage of the wrapper at the middle of the straight section. In removing the insulation from the test bars the individual layers in the joint between the wrapper and tape were fused together into a uniform, homogenous insulator layer.

While the entire straight portions of the return bent coil are wrapped with insulative tape, it is preferable not to apply tape to the entire return bent section prior to the vacuum-pressure operation. Upon curing, the impregnating liquid resin permanently sets into a hard, solid layer. This may be disadvantageous at the knuckle ends 12 and 18, which are subject to being distorted during subsequent installation of the coil into the iron core of the machine.

Therefore, it is advantageous to apply the mica tape only at the joint between wrapper and tape and for a distance along short sections 10, 10A and 16, 16A. Prior to reaching knuckle sections 12 or 18, wrapping with tape 26 is discontinued and after vacuum-pressure impregnation and subsequent heating, fully cured tape 27, schematically shown as being applied from roll 29, is applied instead. Tape 27, being fully cured, will not set up into a hard, relatively inflexible covering but will retain its flexibility so that it can sustain the deformation which knuckles 12 and 18 will undergo during installation.

The joint between tape 26 and tape 27 is sufficiently beyond the end of the imposed magnetic field and the iron core so that it is subjected to a lower electrical stress than is the joint between tape 26 and wrapping 24.

If the knuckles are not subject to distortion during subsequent operations and installation, then the impregnatable mica tape may be used along the entire return bent sections.

The mica wrapper and mica tape suitable for vacuum impregnation may be any one of the following commercially available materials: (naturally, any suitable materials can be used)

| Manufacturer | Manufacturers code no. | Construction |
|---|---|---|
| General Electric Company | 77953 | Polyester mat, non-woven glass, mica paper |
| Minnesota Mining & Manufacturing Co. | X4714 | Polyester mat, Micanite II paper |
| Minnesota Mining & Manufacturing Co. | X4724 | Woven glass cloth, Micanite II paper |
| Chase Foster Div. of Keene Corporation | 704A | Woven glass cloth, Mica Paper |

The following solventless epoxy liquid resins are suitable for vacuum-pressure impregnation processing as described above:

| Manufacturer | Manufacturers code no. |
|---|---|
| Sterling Division of Reichhold Chemical Inc. | Y-881 |
| Sterling Division of Reichhold Chemical Inc. | Y-833 |
| General Electric Company | 74021 |
| Minnesota Mining & Manufacturing Co. | 410 |

Each manufacturer's mica wrapper and tape material will be chemically compatible with its resin, but cross-combinations must be tested for this property. We have found the Chase-Foster Division 704A material is compatible with both Sterling Division resins Y-881 and Y-833.

While a specific embodiment of the invention has been described with reference to a full coil, i.e., to a coil which has the general rectangular or diamond shape illustrated in FIG. 1, the invention is equally applicable to half-coils which have the general configuration which the coil of FIG. 1 would have if it were bisected along a line running through the center of knuckles 12 and 18. A half coil has not of course, the knuckle turns that a full coil has and accordingly, this is another instance where mica or other tape may be applied along the entire length of the return bent section prior to vacuum pressure impregnation.

Insulated coils containing variations and modifications which fall within the spirit and scope of the invention will occur to those skilled in the art upon reading and understanding the foregoing specification. It is intended to include all such variations and modifications within the following claims or the equivalents thereof.

What is claimed is:

1. An insulated coil for an electrodynamic machine, said coil comprising one or more straight sections and one or more return bent sections,
   one or more turns of insulated wrapping on said coil,
   a portion of said wrapping being on said straight sections and comprising the finish cured product of a liquid resin impregnated wrapper of a width sufficient to cover at least a substantial segment of the entire length of said straight section of said coil, and a portion of said wrapping being on said return bent sections and comprising the finish cured product of a liquid resin-impregnated tape, said tape being contiguous with said wrapper and both said tape and said wrapper being impregnated with said liquid resin by vacuum-pressure impregnation.

2. The coil of claim 1 wherein said wrapper is of a width sufficient to cover substantially the entire length of said straight section of said coil.

3. The coil of claim 1 wherein said wrapper is of a width sufficient to cover at least about one-third of the entire length of said straight section.

4. An improved electrodynamic machine, the improvement comprising the coils of claim 1 contained within said machine.

5. The coil of claim 2 wherein said impregnating liquid resin is selected from the class consisting of epoxy resins, polyester resins and mixtures thereof.

6. The coil of claim 2 wherein said wrapper and said tape contain mica as an insulating medium.

7. The coil of claim 6 wherein said mica comprises at least 50 percent by weight of said wrapper and at least 50 percent by weight of said tape.

8. The coil of claim 2 wherein said return bent portion of said coil includes a knuckle portion, and said knuckle portion has wrapped along at least a portion of its length a fully cured tape which is contiguous to said resin-impregnated tape.

9. The coil of claim 2 wherein said wrapper is telescoped at the edges thereof so that successive widths of diminishing numbers of layers of wrapper appear at each end thereof, and said tape is in overlapping relationship to said telescoped ends of said wrapper.

10. An electrodynamic machine having one or more insulated coils contained therein, each of said coils comprising one or more straight sections and one or more return-bent sections, an insulative wrapping on said coil, said wrapping comprising the finish-cured product of one or more turns of a liquid-resin-impregnated wrapper of a width sufficient to substantially cover the entire length of said straight section of said coil, and one or more turns of the finish cured product of a liquid resin-impregnated tape wrapped around a portion at least of said return-bent portion, said wrapper and said tape being in overlapping relationship at their respective edges and both said wrapper and said tape being impregnated with said liquid resin by vacuum-pressure impregnation.

11. The machine of claim 10 wherein said liquid resin is selected from the class consisting of epoxy, polyester, and mixtures thereof.

12. The machine of claim 10 further including layers of finishing tape over said wrapping.

13. The machine of claim 12 further including a coating of baked varnish on said layers of finishing tape.

14. The machine of claim 10 wherein said return bent sections have knuckle portions and said knuckle portions have wrapped along at least a portion of their length a fully cured tape which is contiguous to said resin-impregnated tape.

* * * * *